United States Patent
Lee

(10) Patent No.: US 6,902,300 B2
(45) Date of Patent: Jun. 7, 2005

(54) BACK LIGHT ASSEMBLY HAVING ELASTIC SUPPORT MEMBER FOR LIQUID CRYSTAL DISPLAY DEVICE

(75) Inventor: Joung Jae Lee, Kumi-shi (KR)

(73) Assignee: LG. Philips LCD Co., Ltd., Seoul (KR)

(*) Notice: Subject to any disclaimer, the term of this patent is extended or adjusted under 35 U.S.C. 154(b) by 489 days.

(21) Appl. No.: 09/893,622

(22) Filed: Jun. 29, 2001

(65) Prior Publication Data

US 2002/0044437 A1 Apr. 18, 2002

(30) Foreign Application Priority Data

Oct. 14, 2000 (KR) .......................................... 2000-60569

(51) Int. Cl.⁷ .............................................. F21V 15/04
(52) U.S. Cl. ..................... 362/306; 362/390; 349/60; 411/378
(58) Field of Search ............................. 362/23, 28, 29, 362/16, 217, 223, 227, 235, 236, 551, 559, 561, 257, 260, 296, 306, 307, 308, 310, 311, 390, 431; 411/378; 248/632, 188.9; 349/56, 58, 60

(56) References Cited

U.S. PATENT DOCUMENTS

| | | | |
|---|---|---|---|
| 60,967 A | * 1/1867 | Torrey | 248/188.9 |
| 134,783 A | * 1/1873 | Bidwell et al. | 411/378 |
| 268,697 A | * 12/1882 | Lewis | 248/188.9 |
| 316,619 A | * 4/1885 | Hayes | 411/378 |
| 664,652 A | * 12/1900 | Lambert | 411/378 |
| 667,555 A | * 2/1901 | McHagan | 411/378 |
| 755,713 A | * 3/1904 | Shanahan | 248/188.9 |
| 977,710 A | * 12/1910 | Craig | 411/378 |
| 1,603,195 A | * 10/1926 | Crain | 411/378 |
| 1,921,561 A | * 8/1933 | Christmans | 248/188.9 |
| 2,865,133 A | * 12/1958 | Hoven et al. | 248/188.9 |
| 3,604,675 A | * 9/1971 | Mitchell et al. | 248/156 |
| 3,828,215 A | * 8/1974 | Bilsback | 313/50 |
| 4,089,045 A | * 5/1978 | Mars | 248/634 |

* cited by examiner

Primary Examiner—Alan Cariaso
Assistant Examiner—Ismael Negron
(74) Attorney, Agent, or Firm—McKenna Long & Aldridge LLP

(57) ABSTRACT

A back light assembly for a liquid crystal display device includes at least one or more diffusion plate supporting members disposed between a reflection sheet and a diffusion plate, and having a complex structure including an elastic material in contact with the diffusion plate, the diffusion plate supporting member preventing the diffusion plate from dropping down.

28 Claims, 4 Drawing Sheets

BACK LIGHT ASSEMBLY HAVING ELASTIC SUPPORT MEMBER FOR LIQUID CRYSTAL DISPLAY DEVICE

This application claims the benefit of Korean Patent Application No. 2000-60569, filed on Oct. 14, 2000, under 35 U.S.C. §119, the entirety of which is hereby incorporated by reference as if fully set forth herein.

BACKGROUND OF THE INVENTION

1. Field of the Invention

The present invention relates to a liquid crystal display device, and more particularly, to a back light assembly for a liquid crystal display device.

2. Discussion of the Related Art

Generally, a cathode ray tube (CRT) is mainly used in monitors for information terminals and measuring instruments as well as a television. It has been difficult to miniaturize and reduce the weight of the CRT. Thus, a liquid crystal display device has been actively developed that is small in size and light weight and with low power consumption. Recently, the liquid crystal display device, which is a flat panel display device, has been used as a display for a laptop computer, a monitor for desktop computer, a large monitor of 30 inches or greater, and a wall-mount TV. The demand for the liquid crystal display device is increasing.

Such a liquid crystal display device is a light-receiving device which displays an image by controlling the quantity of external light. Accordingly, a separate light source, i.e., a back light assembly for irradiating light to a liquid crystal display panel, is required.

The back light assembly is classified into an edge type and a direct type depending on the position of the light source against a display area. The direct type back light assembly is widely used in a large sized liquid crystal display device of 30 inches or greater because it has high light transmittivity, it is easy to handle and it does not have a limitation in the size of the display area.

The direct type back light assembly does not require a light guide plate, which directs linear light from a light source (lamp) to the display surface. The direct type back light assembly includes a plurality of lamps, a reflection sheet and a diffusion plate. The lamps are provided at a lower portion of the display area. The reflection sheet reflects light irradiated from the lamps in the display area so as to avoid loss of light. The diffusion plate diffuses light in an upper portion of the lamps to emit uniform light.

Here, because a considerable amount of space exists between the lamp and the diffusion plate, the diffusion plate drops down due to its own weight and/or high temperature. To prevent the diffusion plate from dropping down, a plurality of supports are provided between the diffusion plate and the reflection sheet.

A support structure of the diffusion plate of a direct type back light assembly in the related art will be described with reference to the accompanying drawings.

FIG. 1 is a partial sectional view showing a support structure of a diffusion plate of a direct type back light assembly in the related art.

As shown in FIG. 1, a support 6 is provided between a reflection sheet 4 and a diffusion plate 5. A prism sheet 8 is provided on an upper surface of the diffusion plate 5 to improve the luminance of a liquid crystal display panel 9 by converging light diffused through the diffusion plate 5. The liquid crystal display panel 9 is provided on an upper portion of the prism sheet 8 to display data. A plurality of lamps (not shown) are provided in a space between the reflection sheet 4 and the diffusion plate 5.

The support 6 is made of a rigid material such as polycarbonate to sufficiently prevent the diffusion plate 5 from dropping down. Also, the support 6 has a pointed shape at one end to minimize the amount of area covering the display area.

However, the aforementioned support structure of the diffusion plate has several problems. If an external impact or oscillation is applied to the liquid crystal display device, foreign materials or scratches occur on a contact area between the diffusion plate and the support due to friction between them. The foreign materials or scratches act on the display area leading to poor image quality.

In addition, since the support has a pointed end portion, the end portion may be broken or deformed due to such external impact. In this case, the support cannot prevent the diffusion plate from dropping down. To solve such a problem, the support may be of a soft material such as a rubber. In this case, however, the support cannot sufficiently support the diffusion plate due to reduced rigidity.

SUMMARY OF THE INVENTION

Accordingly, the present invention is directed to a back light assembly for a liquid crystal display device that substantially obviates one or more of the problems due to limitations and disadvantages of the related art.

An advantage of the present invention is a back light assembly for a liquid crystal display device that prevents foreign materials or scratches from occurring on a diffusion plate, thereby improving an image.

Another advantage of the present invention is a back light assembly of a liquid crystal display device having a member supporting a diffusion plate with sufficient rigidity to prevent the diffusion plate from dropping down.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a direct type back light assembly of liquid crystal display device includes a mold frame provided with lamp supporters at both ends to receive both ends of at least one or more lamps and support the lamps, at least one or more lamps received in the lamp supporters to be disposed in a lower portion of a display area, a reflection sheet disposed in an upper portion of the mold frame and a lower portion of the lamps for reflecting light irradiated from the lamps to avoid loss of light, a diffusion plate disposed in an upper portion of the lamps for diffusing light irradiated from the lamps to uniformly diffuse light into a prism sheet at its upper portion, and at least one or more diffusion plate supporting means disposed between the reflection sheet and the diffusion plate, having a complex structure including an elastic material in a contact area with the diffusion plate, so as to prevent the diffusion plate from dropping down due to its weight and/or high temperature, and to prevent foreign materials or scratches from occuring due to contact with the diffusion plate during external impact, and to absorb external impact.

The diffusion plate supporting means has a double structure including a support portion coupled to the mold frame at one side, having sufficient rigidity to prevent the diffusion plate from dropping down, and a contact portion having elasticity, coupled to the other side of the support portion and at the same time contacting the diffusion plate.

The contact portion is made of a soft material, preferably silicon rubber, to prevent foreign materials or scratches from occuring on a contact area with the diffusion plate during external impact.

The support portion is made of plastic having sufficient rigidity to prevent the diffusion plate from dropping down. Preferably, the support portion is made of a metal having higher rigidity than plastic to reduce its volume.

The diffusion plate supporting means has a conical shape having a sectional area that is gradually reduced toward an upper portion from a lower portion to ensure sufficient supporting force while minimizing the area covering the display area.

The contact portion has a cap shape in which an insertion hole of a predetermined length is formed to insert an end of the support portion, and a projection is preferably formed along a circumferential direction to prevent the contact portion from being detached when the support portion is inserted into a bottom end in which the insertion hole of the contact portion is formed.

An extension portion is formed at the bottom end of the support portion to enhance cohesion between the mold frame of the support portion and the reflection sheet. A fitting hole having a predetermined length is formed within the bottom end of the support portion to be coupled to the mold frame by a screw passing through a boss of the mold frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
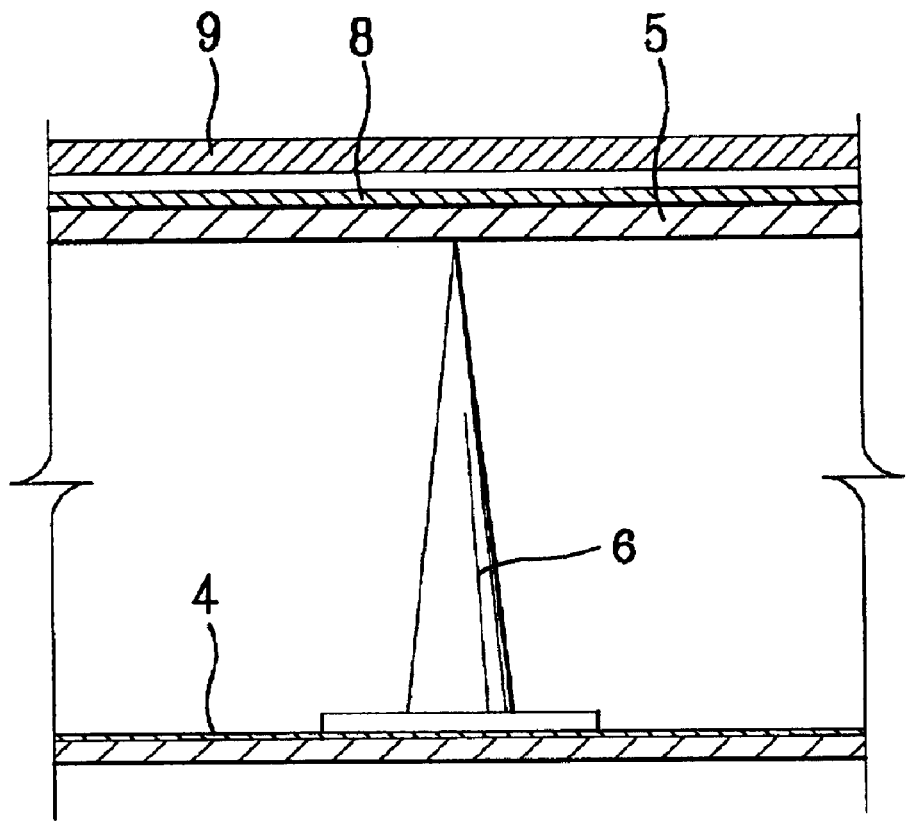
FIG. 1 is a partial sectional view showing a support structure of a diffusion plate of a related art direct type back light assembly.
Figure 2:
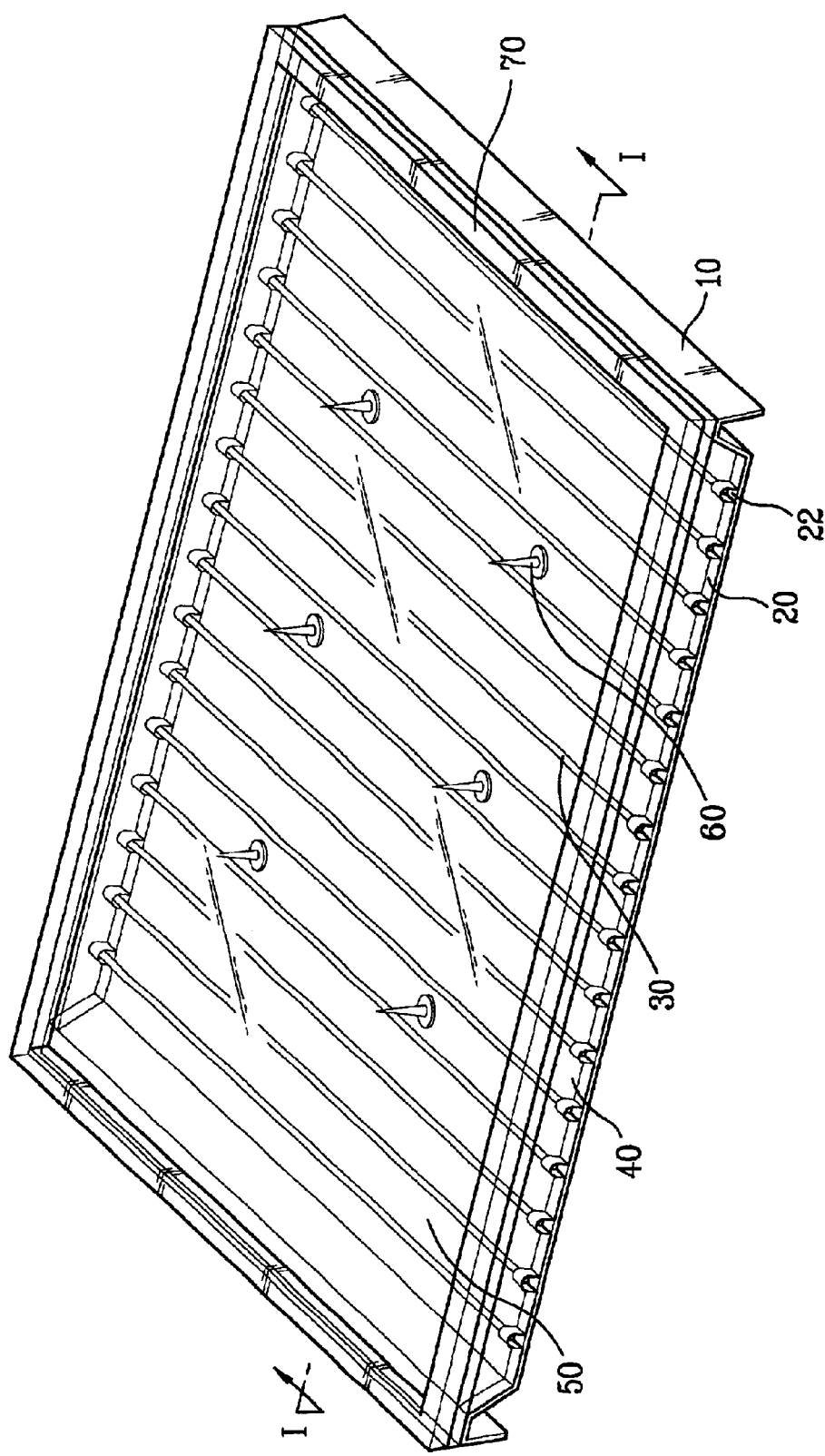
FIG. 2 is a perspective view showing a direct type back light assembly according to an embodiment of the present invention.
Figure 3:
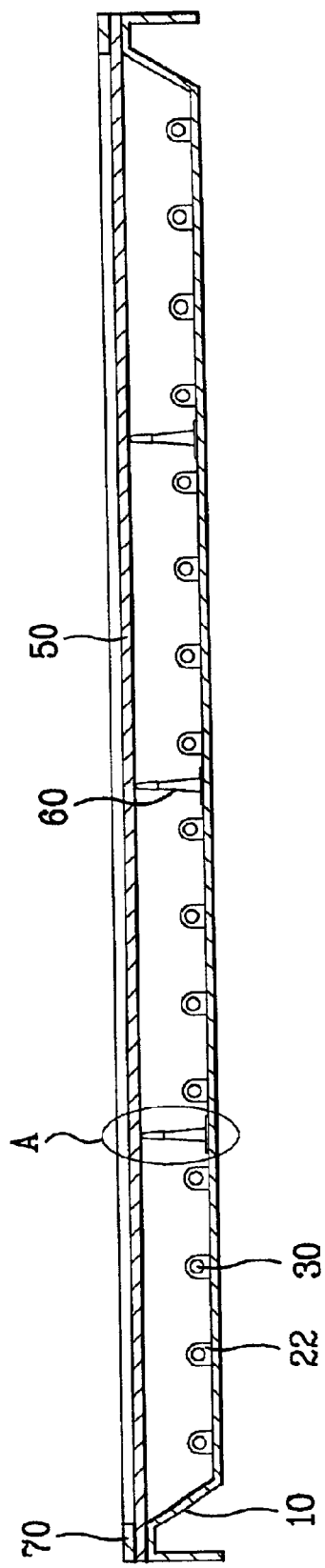
FIG. 3 is a sectional view taken along line I–I' of FIG. 2.

As shown in FIGS. 2 and 3, a direct type back light assembly for a liquid crystal display device according to the present invention includes a mold frame 10, a lamp supporter 20, at least one or more lamps 30, a reflection sheet 40, a diffusion plate 50, and at least one or more diffusion plate supporters 60. The mold frame 10 supports respective elements of a back light assembly and fixes or secures a liquid crystal display panel and circuit parts. The lamp supporter 20 is disposed preferably at both ends of the mold frame 10 in the lengthwise direction to receive both ends of the lamps 30 as well as to support the lamps 30. The lamps 30 are received in the lamp supporter 20 to be disposed in a lower portion of a display area. The reflection sheet 40 is disposed in an upper portion of the mold frame 10 and reflects light irradiated from the lamps 30 to avoid loss of light. The reflection sheet 40 has a structure in which a reflection layer and a packing layer are double-side coated. The diffusion plate 50 is disposed in an upper portion of the lamps 30 and diffuses light irradiated from the lamps 30 to uniformly diffuse light to a prism sheet and to the front of the liquid crystal display panel, thereby widening a viewing angle. At least one or more of the diffusion plate supporters 60 are mounted between the reflection sheet 40 and the diffusion plate 50, and has a complex structure which includes a portion made of an elastic material in a contact area with the diffusion plate 50.

A panel guide 70 is provided at an upper portion of the diffusion plate 50 to mount the liquid crystal display panel.

The lamps 30 preferably include cold cathode fluorescence (CCFL) lamps and may have a rectangular shape, U shape, or W shape, for example. For high luminance and high uniformity, the rectangular shape is preferable. The lamp supporter 20, located at both ends of the mold frame 10, includes a plurality of lamp receiving grooves 22, which are positioned at constant intervals.

The diffusion plate supporter 60 prevents the diffusion plate 50 from dropping down from its own weight and also prevents foreign materials or scratches from occurring on the contact area of the diffusion plate 50 during external impact. The diffusion plate 60 is provided in a space between the reflection sheet 40 and the diffusion plate 50. The diffusion plate supporters 60 are preferably provided at an optimal position to equally divide an area of the diffusion plate 50. For example, as shown in FIG. 2, the diffusion plate 50 is longitudinally divided into four parts and is also transversely divided into three parts. Thus, a total of six diffusion plate supporters 60 are preferably provided in respective divided points.

The diffusion plate supporters 60 preferably acts as an absorbing member capable of absorbing an external impact. The structure of the diffusion plate supporter 60 is shown in FIGS. 4 and 5.

Figure 4:
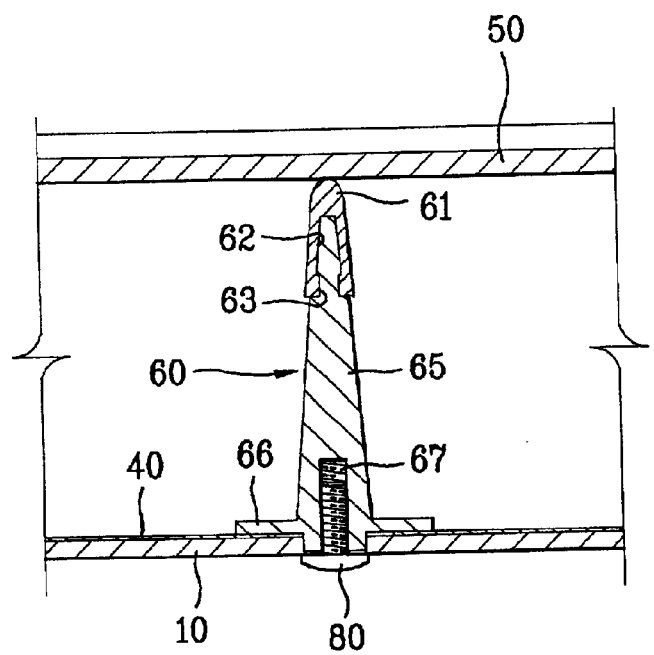
FIG. 4 is an enlarged sectional view of FIG. 3, showing a structure of a diffusion plate supporter according to the embodiment of the present invention.

FIG. 4 is an enlarged sectional view of FIG. 3, showing a structure of the diffusion plate supporter 60 according to the preferred embodiment of the present invention. FIG. 5 is an exploded perspective view showing the diffusion plate supporter 60 according to the embodiment of the present invention.

Figure 5:
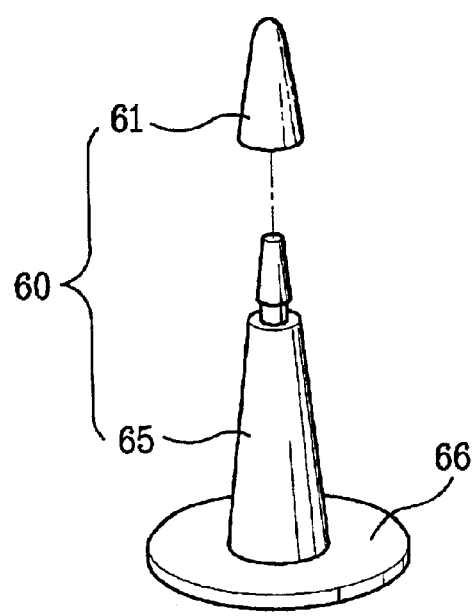
FIG. 5 is an exploded perspective view showing a diffusion plate supporter according to the embodiment of the present invention.

As shown in FIGS. 4 and 5, the diffusion plate supporter 60 has a double structure including a support portion 65 having sufficient rigidity to prevent the diffusion plate from dropping down, and a contact portion 61 having elasticity and contacting the diffusion plate 50. The contact portion 61 is preferably made of a soft material to prevent foreign materials or scratches from occurring on the contact area the diffusion plate 50 during external impact. More preferably, the contact portion 61 is made of a rubber, especially, silicon rubber having sufficient elasticity to absorb an external impact. Since the contact portion 61 is made of rubber, the contact portion 61 can also act as a dustproof member which absorbs oscillation due to impact.

Therefore the support portion 65 is preferably made of a rigid material overcoming a problem related to foreign materials or scratches that may occur on the diffusion plate 50. Any material having rigidity that can support the diffusion plate 50 may be used as the support portion 65. Accordingly, the support portion 65 may be made of plastic such as poly-carbonate. Alternatively, the support portion 65 may be made of metal having high rigidity to reduce the size of the support portion 65.

The aforementioned diffusion plate supporter will now be described in more detail.

To minimize the amount of the diffusion plate supporter 60 from appearing in the display area, the diffusion plate supporter 60 preferably has a conical shape having a sectional area that gradually decreases from a lower portion to an upper portion.

The support portion 65 is coupled to the mold frame 10 at one end and is coupled to the contact portion 61 at the other end. In other words, the contact portion 61 has a cap shape in which an insertion hole 62 of a predetermined length is formed to insert the other end of the support portion 65. A projection 63 is formed along a circumferential direction to prevent the contact portion 61 from being detached when the support portion 65 is inserted into its bottom end in which the insertion hole 62 of the contact portion 61 is formed. When the contact portion 61 is preferably made of a soft material having elasticity, the support portion 65 is closely adhered to the insertion hole 62 of the contact portion 61 by the projection 63. An extension portion 66 is formed at the bottom end of the support portion 65 to enhance cohesion between the mold frame 10 of the support portion 65 and the reflection sheet 40.

In addition, the support portion 65 is partially inserted into the mold frame 10 preferably at a constant length, and a fitting hole 67 having a predetermined length is formed within the bottom end of the support portion 65. Thus, the support 65 is tightly coupled to the mold frame 10 preferably by a screw 80 that passes through a boss in the mold frame 10 through the fitting hole 67.

Thus, the support portion 65 to which the contact portion 61 is inserted at the upper portion is tightly coupled to the mold frame 10. The diffusion plate 50 is thus prevented from dropping down due to deformation caused by its own weight or high temperature of the diffusion plate 50.

As aforementioned, the direct type back light assembly of a liquid crystal display device according to the present invention has the following advantages.

The diffusion plate supporter is formed of a structure that includes a contact portion of a soft material having elasticity and a support portion having rigidity to prevent the diffusion plate from dropping down. Accordingly, it is possible to prevent foreign materials or scratches from occurring on the contact area between the supporter and the diffusion plate during external impact. This prevents poor image due to the foreign materials or scratches of the diffusion plate. In addition, it is possible to prevent the diffusion plate from dropping down due to deformation caused by its own weight and high temperature. Finally, since the support portion is not in contact with the diffusion plate, the support portion can be made of various applicability of the product.

It will be apparent to those skilled in the art that various modifications and variation can be made in the back light assembly for liquid crystal display device of the present invention without departing from the spirit or scope of the invention. Thus, it is intended that the present invention cover the modifications and variations of this invention provided they come within the scope of the appended claims and their equivalent.

What is claimed is:

1. A back light assembly for a liquid crystal display device having a display area, comprising:
    a mold frame having first and second end portions;
    lamp supporters at the first and second end portions of the mold frame;
    a lamp having first and second end portions, the lamp supporters receiving the lamp, the lamp being disposed in a lower portion of the display area;
    a reflection sheet over the mold frame and below the lamp;
    a diffusion plate over the lamp; and
    a diffusion plate supporting member between the reflection sheet and the diffusion plate, wherein only a portion of the diffusion plate supporting member contacting the diffusion plate comprises an elastic material.

2. The back light assembly for a liquid crystal display device of claim 1, wherein the diffusion plate supporting member has a conical shape including a top portion and a bottom portion, the top portion having a smaller circumference than the bottom portion.

3. The back light assembly for a liquid crystal display device of claim 1, further comprising a plurality of diffusion plate supporting members supporting the diffusion plate.

4. The back light assembly for a liquid crystal display device of claim 1, wherein the lamp supporters include lamp receiving grooves.

5. The back light assembly for a liquid crystal display device of claim 1, further comprising a panel guide, the diffusion plate being positioned between the panel guide and the mold frame.

6. The back light assembly for a liquid crystal display of claim 1, wherein the diffusion plate supporting member includes:
    a support portion coupled to the mold frame at one side, the diffusion plate support member having sufficient rigidity to prevent the diffusion plate from dropping down; and
    a contact portion having elasticity, coupled to one end of the support portion contracting the diffusion plate.

7. The back light assembly for a liquid crystal display device of claim 6, wherein the contact portion of the diffusion plate supporting member is made of a soft material.

8. The back light assembly for a liquid crystal display device of claim 6, wherein the contact portion is made of rubber.

9. The back light assembly for a liquid crystal display device of claim 6, wherein the support portion is made of plastic.

10. The back light assembly for a liquid crystal display device of claim 6, wherein the support portion is made of metal.

11. The back light assembly for a liquid crystal display device of claim 6, wherein the support portion includes a base portion extending outward from a bottom end of the support portion.

12. The back light assembly for a liquid crystal display device of claim 6, further comprising means for coupling the diffusion plate supporting member and the mold frame.

13. The back light assembly for a liquid crystal display device of claim 6, further comprising means for immovably coupling the diffusion plate supporting member and the mold frame.

14. The back light assembly for a liquid crystal display device of claim 6, wherein the support portion includes means for enhancing cohesion between the mold frame and the reflection sheet.

15. The back light assembly for a liquid crystal display device of claim 6, wherein the support portion includes a first hole and the mold frame includes a second hole corresponding to the first hole.

16. The back light assembly for a liquid crystal display device of claim 15, wherein a fastening element is passed through the first and second holes of the support portion and the mold frame, respectively, for coupling the diffusion plate supporting member to the mold frame.

17. The back light assembly for a liquid crystal display device of claim 16, wherein the fastening element includes a screw.

18. The back light assembly for a liquid crystal display device of claim 6, wherein the diffusion plate supporting member has a conical shape.

19. The back light assembly for a liquid crystal display device of claim 18, wherein the contact portion includes a cap having an insertion hole for receiving one end of the support portion.

20. The back light assembly for a liquid crystal display device of claim 19, wherein the contact portion further includes a projection to prevent the contact portion from detaching from the support portion once the support portion is inserted into the contact portion through the insertion hole.

21. The back light assembly for a liquid crystal display device of claim 19, wherein the contact portion further includes means for preventing the contact portion from detaching from the support portion once the support portion is inserted into the contact portion through the insertion hole.

22. The back light assembly for a liquid crystal display device of claim 6, wherein the support portion includes a top portion and a bottom portion, the top portion having a smaller circumference than the bottom portion.

23. The back light assembly for a liquid crystal display device of claim 22, wherein the top portion of the support portion has a first conical shape and the bottom portion of the support portion has a second conical shape, the second conical shape being larger than the first conical shape.

24. The back light assembly for a liquid crystal display device of claim 23, wherein the support portion has a middle portion between the top portion and the bottom portion.

25. The back light assembly for a liquid crystal display device of claim 24, wherein the middle portion has a cylindrical shape.

26. The back light assembly for a liquid crystal display device of claim 24, wherein the middle portion is used to couple the contact portion to the support portion.

27. A method of forming a back light assembly having a mold frame, lamp supporters, a lamp, a reflection sheet, a diffusion plate and a supporting member, the method comprising:

coupling lamp supporters to the mold frame;

receiving the lamp at the lamp supporters, the lamp being disposed in a lower portion of the display area;

positioning the reflection sheet over the mold frame and below the lamp;

positioning the diffusion plate over the lamp; and positioning the supporting member between the reflection sheet and the diffusion plate, the supporting member having an elastic material contacting the diffusion plate.

28. A back light assembly comprising:

a mold frame;

lamp supporters coupled to the mold frame;

a lamp coupled to the lamp supporters;

a reflection sheet over the mold frame and below the lamp;

a diffusion plate over the lamp; and a diffusion plate supporting member between the reflection sheet and the diffusion plate, the diffusion plate supporting member having an elastic material contacting the diffusion plate, the diffusion plate supporting member including:

a first portion coupled to the mold frame at one side, the diffusion plate support member having sufficient rigidity to prevent the diffusion plate from dropping down; and a second portion coupled to one end of the first portion contacting the diffusion plate, the second portion having more elasticity than the first portion.

* * * * *